United States Patent Office 2,919,280
Patented Dec. 29, 1959

2,919,280

PRODUCTION OF SALTS OF INDOLE CARBOXYLIC ACID COMPOUNDS

Hartwig Schütt, Hagen, Westphalia, Germany, assignor to Henkel & Cie. G.m.b.H., Dusseldorf-Holthausen, Germany, a corporation of Germany No Drawing. Application February 4, 1957
Serial No. 637,901

Claims priority, application Germany June 23, 1956

13 Claims. (Cl. 260—319)

This invention relates to a process for the production of salts of indole carboxylic acid compounds, and more particularly to the production of salts of indole-2-carboxylic acid compounds and indole-3-carboxylic acid compounds from indole or substituted indoles.

I have found that salts of indole carboxylic acid compounds are obtained with good yields by reacting indole or those substituted indoles which have a hydrogen atom in the 2-position and/or 3-position with carbon dioxide in the presence of an alkaline-acting substance at elevated temperatures and pressures. Depending upon the starting material used, the reaction according to the present invention yields salts of indole carboxylic acid compounds with a carboxyl group attached to a carbon atom of the 5-membered ring in the 2-position or 3-position. If desired, the salts may be transformed into the free acids or their derivatives in accordance with methods well known in the art.

My invention consists broadly in the process of producing indole-carboxylic acid compounds having a carboxyl group attached to a carbon atom of the 5-membered ring, which comprises reacting a compound having a structural formula selected from the group consisting of

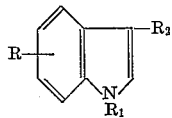

and

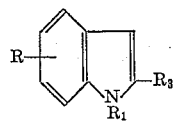

wherein R is selected from the group consisting of hydrogen, alkyl, aryl and carboxy, $R_1$ is selected from the group consisting of hydrogen and alkyl and $R_2$ is selected from the group consisting of hydrogen, alkyl, alkyl-carboxy and aryl, and $R_3$ is selected from the group consisting of hydrogen, alkyl and aryl, with carbon dioxide under pressure and under substantially anhydrous conditions in the presence of an alkaline compound at a temperature between about 150° C. and the decomposition temperature of said starting compound, dissolving the salt of the indole-carboxylic acid compound formed thereby in water, precipitating the corresponding indole-carboxylic acid compound by acidifying the aqueous solution and separating the precipitate from the acidified solution.

The reaction according to the present invention may be conveniently illustrated with unsubstituted indole as the starting material. If potassium carbonate is used as the alkaline-acting substance, the reaction proceeds with the formation of the potassium salt of indole-3-carboxylic acid according to the following equation:

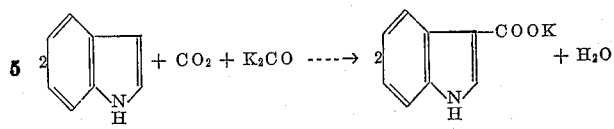

If the starting material is a 3-substituted indole compound, for example skatole (3-methyl-indole), a salt of the corresponding indole-2-carboxylic acid compound is formed in accordance with the following equation:

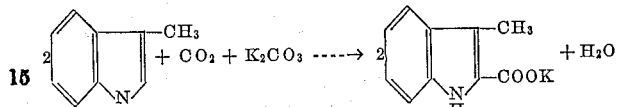

Similarly, if the starting material is a 2-substituted indole compound, for example 2-methyl-indole, a salt of the corresponding indole-3-carboxylic acid compound is formed in accordance with the following equation:

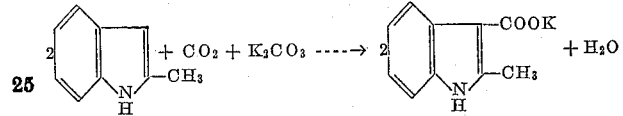

As a rule, somewhat longer reaction periods are required to form the 2-substituted indole-3-carboxylic acid salts.

If the starting material is a N-substituted indole, a mixture of a C-substituted indole-2-carboxylic acid salt and an indole-3-carboxylic acid salt is obtained.

Finally, if the starting material is an indole compound having one or more substituent radicals attached to the six-membered ring, the corresponding substituted indole-2-carboxylic acid salt or indole-3-carboxylic acid salt is formed in accordance with the following equations:

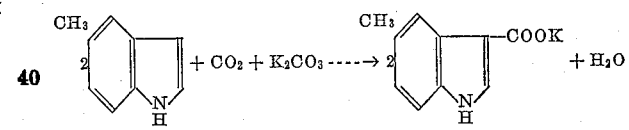

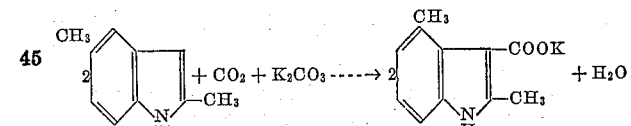

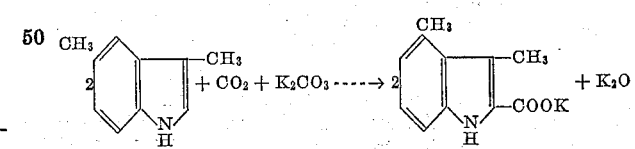

Other substituted indoles which will react analogously to form the corresponding indole-carboxylic acid salts include the following: 3-ethyl-indole, 1-propyl-indole, 2-isobutyl - indole, 3-n-amyl - indole, 2-phenyl-indole, 3-phenyl - indole, 3 - indolyl - acetic acid, 1,3 - dimethyl-indole (1 - methyl - skatole), 7 - methyl - indole, 2,5-dimethyl - indole, 3,5 - dimethyl - indole, 4,7 - dimethyl-indole, 1 - ethyl - 5 - methyl - indole, 2 - phenyl - 7 - methyl - indole, 5 - chloro - 2 - ethyl - indole, 2,4,7 - trimethyl - indole, indole - carboxylic acid-6, 4,5-benzo-indole, 6,7-benzoindole and the like.

The alkaline-acting substance required for the reaction is preferably provided in the form of an alkali metal carbonate. Especially good yields are obtained when potassium carbonate is used. The carbonates of lithium, sodium, rubidium and cesium produce less attractive yields. In place of the carbonates of the above-mentioned elements, their oxides, hydroxides, bicarbonates, formates or oxalates may also be used as the akaline-acting substance.

For optimum results, the reaction conditions should be substantially anhydrous; consequently, the reactants, including the alkaline-acting substance, should be as anhydrous as possible, although the presence of small amounts of water does not seriously interfere with the reaction. The presence of moisture merely reduces the yield of the desired end product somewhat.

In order to utilize the often rather valuable indole compounds serving as the starting materials to the fullest extent, at least that amount of alkaline-acting substance theoretically necessary for the neutralization of the carboxyl group or groups, but preferably an excess thereof, should be used.

The reaction in accordance with the present invention proceeds most advantageously at elevated temperatures, in general above 150° C.; the upper temperature limit is the temperature at which the starting material or the reaction product decomposes. This upper temperature limit is in most cases about 500° C. The optimum reaction temperature is different for the individual indole compounds used as starting materials, but in general it lies between 200 and 350° C.

The reaction is preferably carried out at elevated pressures by introducing into the reaction vessel at least the calculated amount of carbon dioxide, but preferably an excess thereof. The pressure during the reaction may vary within wide limits, for example between 10 and 500 atmospheres or more. The carbon dioxide may be diluted with an inert gas, such as nitrogen. The reaction may, however, also be carried out at atmospheric pressure; for example by passing a mixture of vaporized indole compound and carbon dioxide over heated potassium carbonate.

I have further found, that the reaction according to the present invention is favored by the presence of a number of catalysts. The metals zinc, cadmium, lead, mercury and iron, as well as compounds of these metals, have especially advantageous catalytic effects. Suitable compounds of the above metals are, for example, their oxides and their inorganic or organic acid salts. The amount of catalysts added to the reaction mixture may vary within wide limits; for example from 0 to 20%, preferably from 1 to 5%, by weight based on the weight of indole compound. In most cases the yield of indole-carboxylic acid salt compound is satisfactory even without the addition of catalysts. The reaction product obtained in the presence of a catalyst of the type described is, however, almost always more pure than the corresponding product produced without a catalyst.

In addition to the catalysts, inert fillers such as sand, finely divided carbon kieselguhr, bentonite, powdered metal or metal shavings, inert salts such as sodium sulfate, potassium sulfate, calcium carbonate and the like, may be added to the reaction mixture. The fillers are advantageously added to the starting material in those cases where the reaction mixture tends to cake.

Similarly, the addition of inert organic solvents or diluents such as pyridine, dioxan, tetrahydrofuran, benzene, toluene, xylene, high-boiling-point gasolines, and so forth, to the starting material may sometime be advantageous. These solvents also have the effect of preventing the reaction mixture from caking, and they further facilitate the agitation of the reaction mixture.

For purification of the reaction product, it may be dissolved in water and thereafter freed from discoloring matter and other undesirable components by filtration or adding activated charcoal or other adsorptive purifying agents to the solution. By acidification of the aqueous solution with strong acids, such as hydrochloric acid or sulfuric acid, or with acid anhydrides, the free indole-carboxylic acid compound may be obtained in the form of a precipitate which is difficultly soluble in water. The relative insolubility of the potassium salts of the indole-carboxylic acid compound in a saturated potassium carbonate solution may also be made use of for the isolation of the reaction product. The raw reaction product may, however, also be transformed directly into derivatives of the indole-carboxylic acid compounds, such as their chlorides or esters, in accordance with well known methods.

The following examples will further illustrate the present invention and enable others skilled in the art to understand it more completely. It is, however, not intended to limit the invention to these particular illustrative examples.

*Example I*

10.0 gm. indole and 100.0 gm. anhydrous potassium carbonate were admixed and the mixture was finely milled and placed into a rotary autoclave having a net volume of 200 cc. After pre-cooling the autoclave, 60 gm. of liquid carbon dioxide were introduced. The reaction mixture was then heated for 5 hours at 240° C., whereby a maximum internal pressure of 250 atmospheres developed in the autoclave. After cooling and releasing the internal pressure, the colorless reaction product, which weighed 115.4 gm. was dissolved in 300 cc. cold water. By extraction with ether, 1.2 gm. unreacted indole were recovered. The extracted aqueous solution was filtered and acidified with hydrochloric acid. The precipitated indole-3-carboxylic acid was filtered off and dried. In all, 11.2 gm. indole-3-carboxylic acid were obtained. Taking into consideration the amount of recovered unreacted indole, this corresponds to a yield of 93% of theory.

*Example II*

10.0 gm. indole, 50.0 gm. anhydrous potassium carbonate and 2.0 gm. cadmium fluoride were admixed and the mixture was finely milled and thereafter placed into a rotary autoclave having a net volume of 200 cc. 50 atmospheres carbon dioxide were introduced and the autoclave was heated for 3 hours at 260° C. After cooling and releasing the internal pressure, the faintly yellow reaction product was suspended in 200 cc. water with the addition of 50 cc. ether. The ether layer yielded 5.2 gm. unreacted indole. The colorless aqueous phase was centrifuged to remove the insoluble catalyst and then acidified with hydrochloric acid until it contained about 1% free hydrochloric acid. The precipitated indole-3-carboxylic acid was filtered off. The yield was 5.6 gm. Taking into consideration the recovered unreacted indole, this corresponds to a yield of 85% of theory.

*Example III*

The same starting materials as in Example II were heated under otherwise identical conditions for 8 hours at 260° C. The purification took place in the same manner and yielded 10.0 gm. indole-3-carboxylic acid. Taking into consideration the recovery of 2.2 gm. unreacted indole, this corresponds to a yield of 93% of theory.

*Example IV*

4.0 gm. skatole and 20.0 gm. anhydrous potassium carbonate were admixed and the mixture was finely milled and thereafter heated in an autoclave in an atmosphere of carbon dioxide at an initial pressure of 50 atmospheres for 4 hours at 260° C. The faintly yellow reaction product, which weighed 23.2 gm., was dissolved in 100 cc. water. After extraction of the unreacted skatole with ether, the aqueous solution was filtered and acidified with hydrochloric acid. 2.5 gm. skatole-2-carboxylic acid were obtained, which were readily purified by recrystallization from boiling water in the presence of activated charcoal.

*Example V*

A mixture of 5.0 gm. 2-methylindole, 50 gm. anhydrous potassium carbonate and 1.0 gm. anhydrous cadmium chloride was heated for 12 hours at 260° C. in an atmosphere of carbon dioxide at an initial pressure of about 50 atmospheres. The maximum pressure reached during that period was 300 atmospheres. The purification of the reaction mixture and the isolation of the reaction product were carried out in the same manner as described in Example IV. 1.6 gm. 2-methylindole-carboxylic acid-3 were obtained.

*Example VI*

A mixture of 8.0 gm. N-methylindole, 100.0 gm. anhydrous potassium carbonate and 60 gm. liquid carbon dioxide was heated in an autoclave for 5 hours at 240° C., during which the internal pressure reached about 300 atmospheres. The reaction product was dissolved in 400 cc. water. After extracting the neutral components with ether, the aqueous solution was acidified with hydrochloric acid. 1.6 gm. of a mixture of 2-methylindole-carboxylic acid-3 and 3-methylindole-carboxylic acid-2 crystallized out.

Substantially the same good yields of the indole-carboxylic acid compounds as those in the above examples were obtained when the various indole compounds were reacted with carbon dioxide and potassium carbonate in the presence of metallic zinc, cadmium, lead, mercury, iron, oxides of these metals, or inorganic or organic acid salts of these metals.

Furthermore, when the oxides, hydroxides, bicarbonates, formates or oxalates of potassium, sodium, lithium, rubidium and cesium were substituted as alkaline-acting substances for the potassium carbonate in the above examples, the same results were obtained, except that the lithium and sodium salts produced substantially smaller yields of indole-carboxylic acid compounds than the corresponding potassium, rubidium or cesium salts.

While I have illustrated the present invention with the aid of certain specific embodiments thereof, it will be apparent to persons skilled in the art that my invention is not limited to these embodiments and that various changes and modifications may be made therein without departing from the spirit of the invention or the scope of the appended claims.

I claim:

1. The process of producing indole-carboxylic acid compounds selected from the group consisting of alkali metal salts of 2-carboxylic acids and alkali metal salts of 3-carboxylic acids which comprises reacting a compound free from phenolic hydroxyl groups having a structural formula selected from the group consisting of

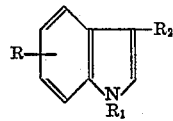

and

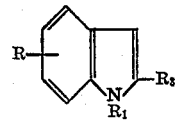

wherein R is selected from the group consisting of hydrogen, alkyl, aryl and carboxy, $R_1$ is selected from the group consisting of hydrogen and alkyl, $R_2$ is selected from the group consisting of hydrogen, alkyl, alkyl-carboxy and aryl, and $R_3$ is selected from the group consisting of hydrogen, alkyl and aryl, with carbon dioxide under pressure and under substantially anhydrous conditions in the presence of an alkali metal carbonate at a temperature between about 150° C. and the decomposition temperature of said starting compound.

2. The process according to claim 1, wherein the alkali metal carbonate is potassium carbonate.

3. The process according to claim 1, wherein the reaction is carried out in the presence of inert solid materials.

4. The process of claim 1 wherein said indole-carboxylic acid is obtained from said reaction mix comprising dissolving the salt of the indole-carboxylic acid compound formed thereby in water, precipitating the corresponding indole-carboxylic acid compound by acidifying the aqueous solution and separating the precipitate from the acidified solution.

5. The process of claim 1 wherein said process is carried out in the presence of a catalyst selected from the group consisting of zinc, cadmium, mercury, lead and iron, and their oxides, inorganic acid salts and organic acid salts.

6. The process of claim 5 wherein the catalyst is cadmium fluoride.

7. The process of claim 5 wherein the catalyst is cadmium chloride.

8. The process of producing alkali metal salts of indole-3-carboxylic acid which comprises reacting indole with carbon dioxide under pressure and under substantially anhydrous conditions in the presence of an alkali metal carbonate at a temperature between about 200° C. and about 350° C.

9. The process of claim 8 wherein said process is carried out in the presence of a catalyst selected from the group consisting of zinc, cadmium, mercury, lead and iron, and their oxides, inorganic acid salts and organic acid salts.

10. The process of producing alkali metal salts of 3-methyl-indole-2-carboxylic acid which comprises reacting 3-methyl-indole with carbon dioxide under pressure and under substantially anhydrous conditions in the presence of an alkali metal carbonate at a temperature between about 200° C. and about 350° C.

11. The process of producing alkali metal salts of 2-methyl-indole-3-carboxylic acid which comprises reacting 2-methyl-indole with carbon dioxide under pressure and under substantially anhydrous conditions in the presence of an alkali metal carbonate at a temperature between about 200° C. and about 350° C.

12. The process of producing a mixture of alkali metal salts of 2-methyl-indole-3-carboxylic acid and 3-methyl-indole-2-carboxylic acid which comprises reacting N-methyl-indole with carbon dioxide under pressure and under substantially anhydrous conditions in the presence of an alkali metal carbonate at a temperature between about 200° C. and about 350° C.

13. The process of claim 1 wherein the temperature of the reaction is maintained between about 200° C. and about 350° C.

References Cited in the file of this patent

UNITED STATES PATENTS

| | | |
|---|---|---|
| 2,003,421 | Ballauf et al. | June 4, 1935 |
| 2,407,452 | Robinson et al. | Sept. 10, 1946 |
| 2,453,105 | Wolthius et al. | Nov. 2, 1948 |
| 2,527,366 | Livak et al. | Oct. 24, 1950 |

OTHER REFERENCES

Palfray et al.: C. A., vol. 43 (1949), p. 2972g.